United States Patent
Shuford, IV

(10) Patent No.: US 7,638,153 B2
(45) Date of Patent: Dec. 29, 2009

(54) CAKE MAKING METHOD

(76) Inventor: Robert Shuford, IV, 2010 Marquette Rd., Chula Vista, CA (US) 91913

( * ) Notice: Subject to any disclaimer, the term of this patent is extended or adjusted under 35 U.S.C. 154(b) by 961 days.

(21) Appl. No.: 10/966,397

(22) Filed: Oct. 14, 2004

(65) Prior Publication Data

US 2006/0083829 A1 Apr. 20, 2006

(51) Int. Cl.
*A21D 13/00* (2006.01)
(52) U.S. Cl. .................. 426/283; 426/496
(58) Field of Classification Search .......... None
See application file for complete search history.

(56) References Cited

U.S. PATENT DOCUMENTS

| | | |
|---|---|---|
| 1,445,187 A | 2/1923 | Vaughan |
| 2,998,318 A | 8/1961 | Forkner ............ 99/86 |
| 4,020,188 A | 4/1977 | Forkner ............ 426/95 |
| 4,822,627 A | 4/1989 | Clegg et al. ......... 426/101 |
| 5,215,774 A * | 6/1993 | Moder et al. ......... 426/243 |

OTHER PUBLICATIONS

Pillsbury's Bake Off Cake Cook Book, 1969, p. 99.*

* cited by examiner

*Primary Examiner*—Lien Tran
(74) *Attorney, Agent, or Firm*—Steins & Associates, P.C.

(57) ABSTRACT

A Cake Making Method is disclosed. Also disclosed is a method that results in the creation of a cake having a standard cake base and a filling of another, viscous, semi-liquid flavored filling. The resulting cake does not have any external blemishes or apertures on its external surface. The method does not require cutting, penetrating or trenching the cake in order to insert the filling; the entire filled cake is be pre-filled before baking.

12 Claims, 6 Drawing Sheets

CAKE MAKING METHOD

BACKGROUND OF THE INVENTION

1. Field of the Invention

This invention relates generally to baked goods and, more specifically, to a Cake Making Method.

2. Description of Related Art

A virtually limitless variety of edible confections have been made both by home bakers and professional bakers for all time. In order to further add flavor, texture and overall desirability to many of these items, they can be filled with some sort of filling, such as fruit jam, frosting, custard, etc. Filled doughnuts are particularly common. In practice, doughnuts are filled after baking by squeezing the filling through a hole poked in the side of the doughnut until a cavity formed within the doughnut is adequately filled.

Unlike doughnuts, cakes have typically been covered on their outside surfaces with frosting, but have not had any filling put inside of them. The most common "filling" method for cakes is the layer cake, wherein layers of frosting and cake are stacked up to form the cake. Where cakes have been filled with filling material, it's been accomplished as shown in FIGS. 1 and 2.

FIG. 1 is a perspective view depicting one conventional approach to filling cakes. Here, the cake 10 (a bundt-style cake) is being filled by squeezing the liquid filling into an aperture 14 formed in the side of the cake 10 using a pastry bag 12. As with filled doughnuts, the cake 10 is fully cooked prior to its being filled. There are at least two problems with this approach: first, particularly in the case of a bundt cake, it is impossible to fill the entire interior of the cake 10 by injecting through a single aperture 14; this means that several apertures 14 must be formed around the outer surface of the cake 10, thereby making unsightly scars on the surface of the cake. Second, this process is an added step in the preparation of the cake that could tend to be very time-consuming.

FIG. 2 is an exploded perspective view depicting another conventional approach to filling cakes. In this other prior method, the cake 10 is cut around its periphery to form a top half 16 and a bottom half 18. Next, a depression 20 is formed in the bottom half 18 and/or the top half 16. The filling material is then squeezed or otherwise placed in the depression 20 and the halves 16 and 18 are reassembled. This prior method suffers from the same problems as does the approach discussed above in connection with FIG. 1.

For the purpose of later comparison herein, FIG. 3 depicts the steps of these two prior methods 22. First, the ingredients are mixed to form a batter 100. Next, the batter is placed into a form 102, such as a shaped cake pan. Next, the batter is baked while being held within the form 104. Once fully baked, the cake is removed from the form 106 and allowed to cool sufficiently to handle.

When cooled sufficiently, either the filling method of FIG. 1 or FIG. 2 is employed. First, an aperture is formed in the cake 108; next, the cake is partially filled with filling material through the aperture via a pastry bag 110. These steps are repeated 112 around the cake until the desired amount of filling has been added to the cake.

If choosing the second filling method, the cake is first butterflied 114 (i.e. cut in two halves). Next, depression(s) are dug out in one or both halves 116. The depression(s) are then filled with filling material 118, and the cake is reassembled 120.

Neither of these prior cake baking and filling methods are suitable to easily create an aesthetically pleasing, filled cake.

SUMMARY OF THE INVENTION

In light of the aforementioned problems associated with the prior methods, it is an object of the present invention to provide a Cake Making Method. The method should result in a cake having a standard cake base and a filling of another, viscous, semi-liquid flavored filling. The resulting cake should not have any external blemishes or apertures. The method should not require cutting, penetrating or trenching the cake in order to insert the filling; the entire filled cake should be pre-filled before baking.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Cake Making Method.

Figure 1:
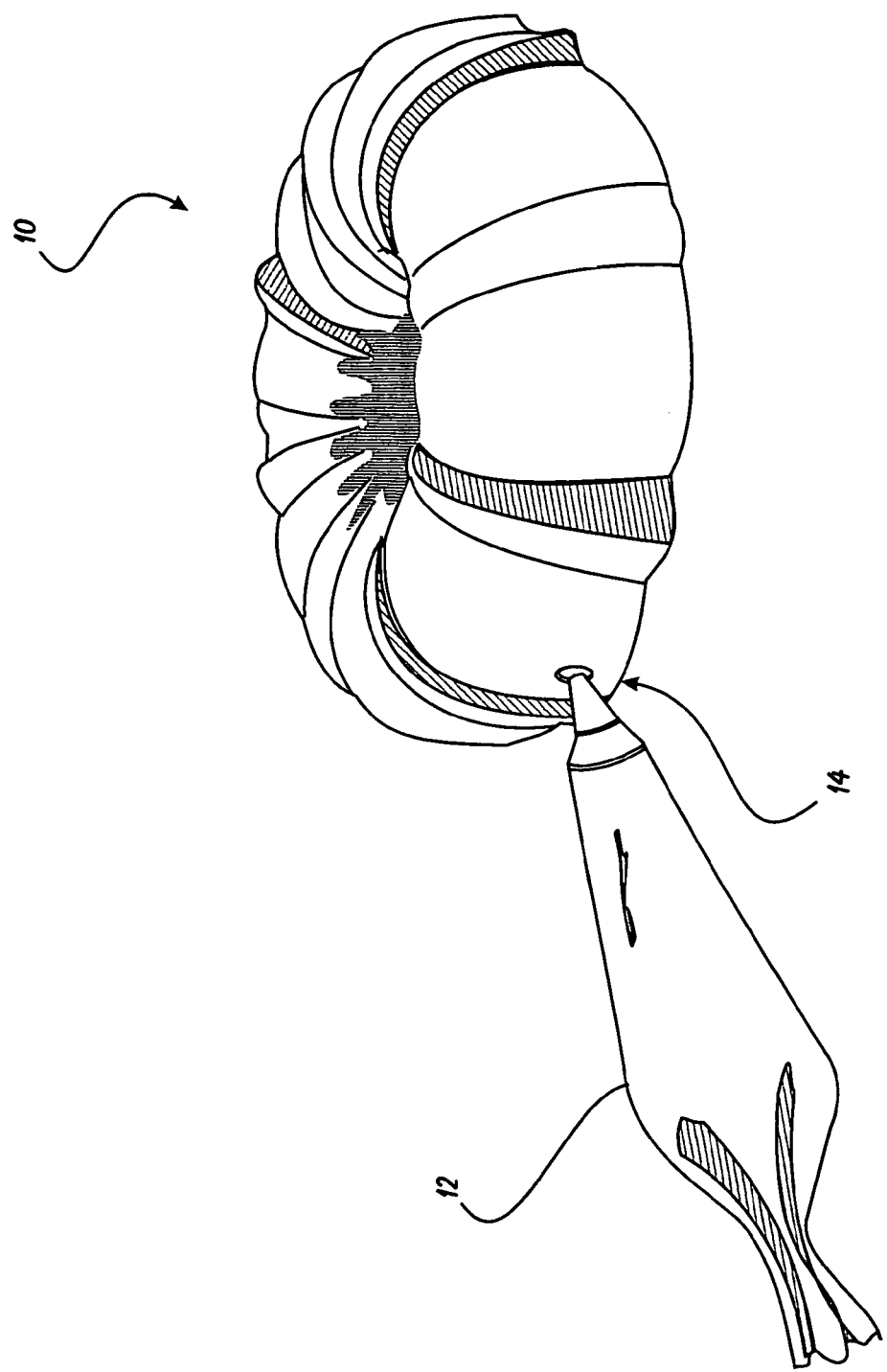
FIG. 1 is a perspective view depicting one conventional approach to filling cakes.
Figure 2:
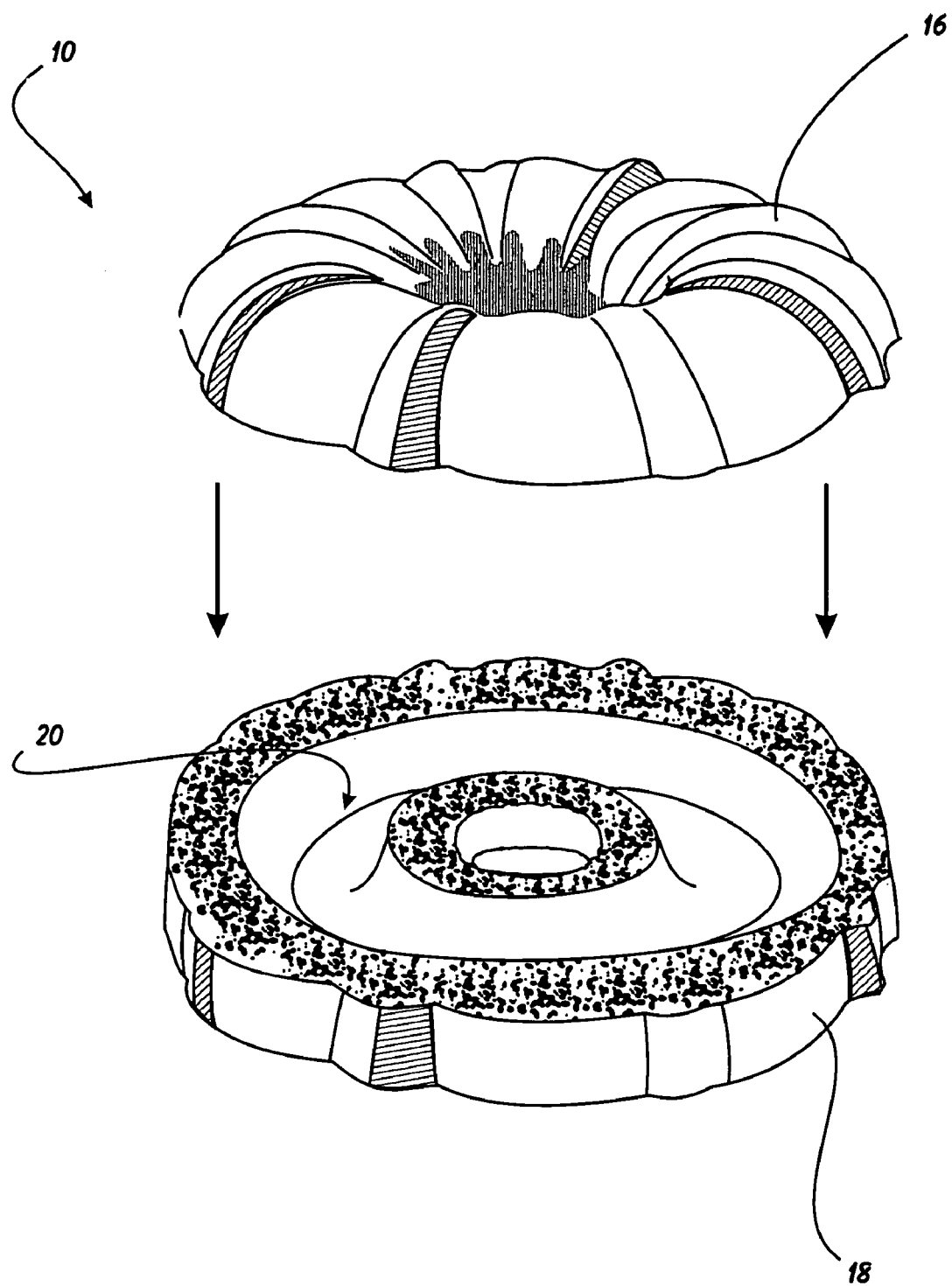
FIG. 2 is an exploded perspective view depicting another conventional approach to filling cakes.
Figure 3:
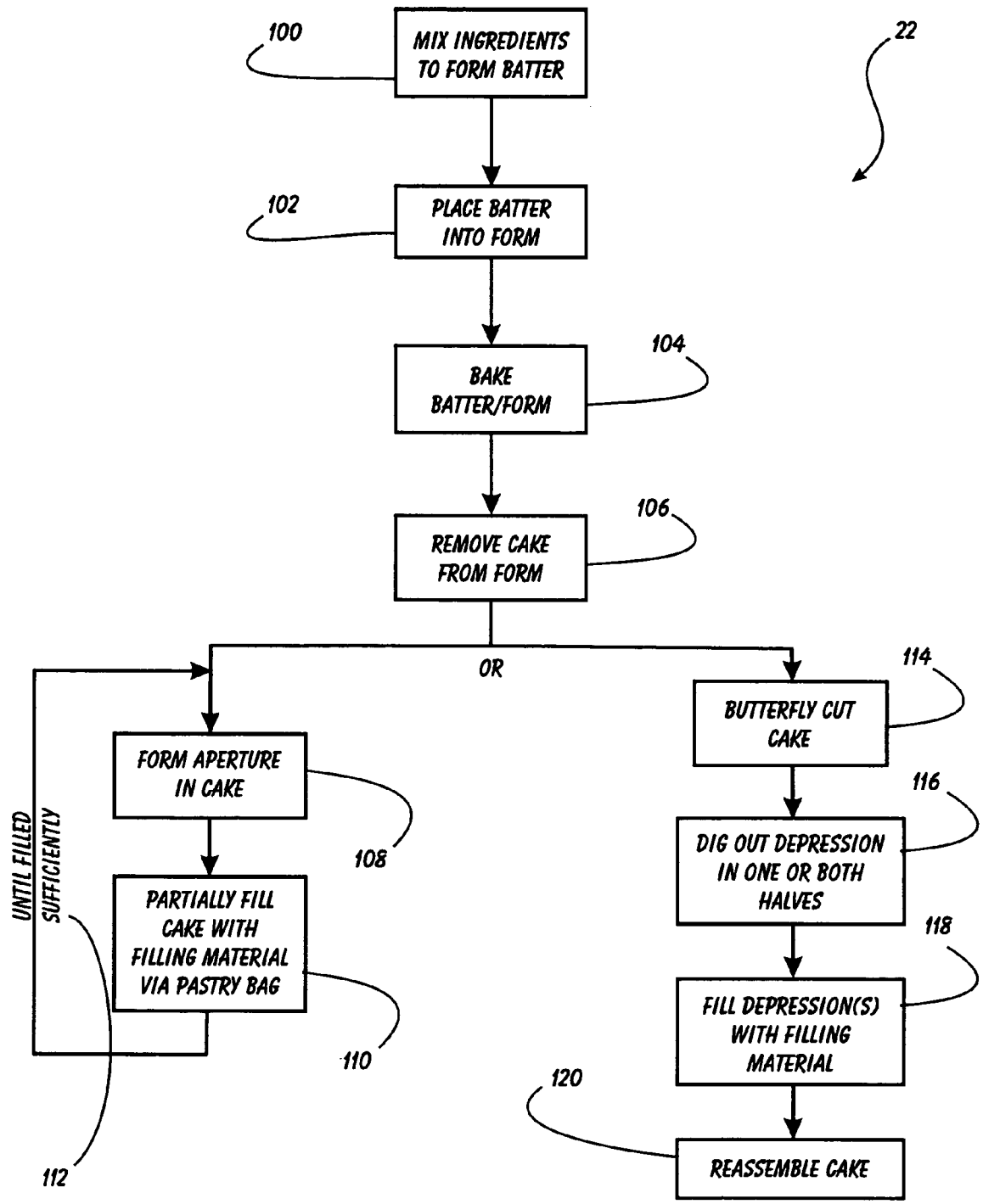
FIG. 3 is a flowchart depicting the steps executed in the methods of FIGS. 1 and 2.
Figure 4:
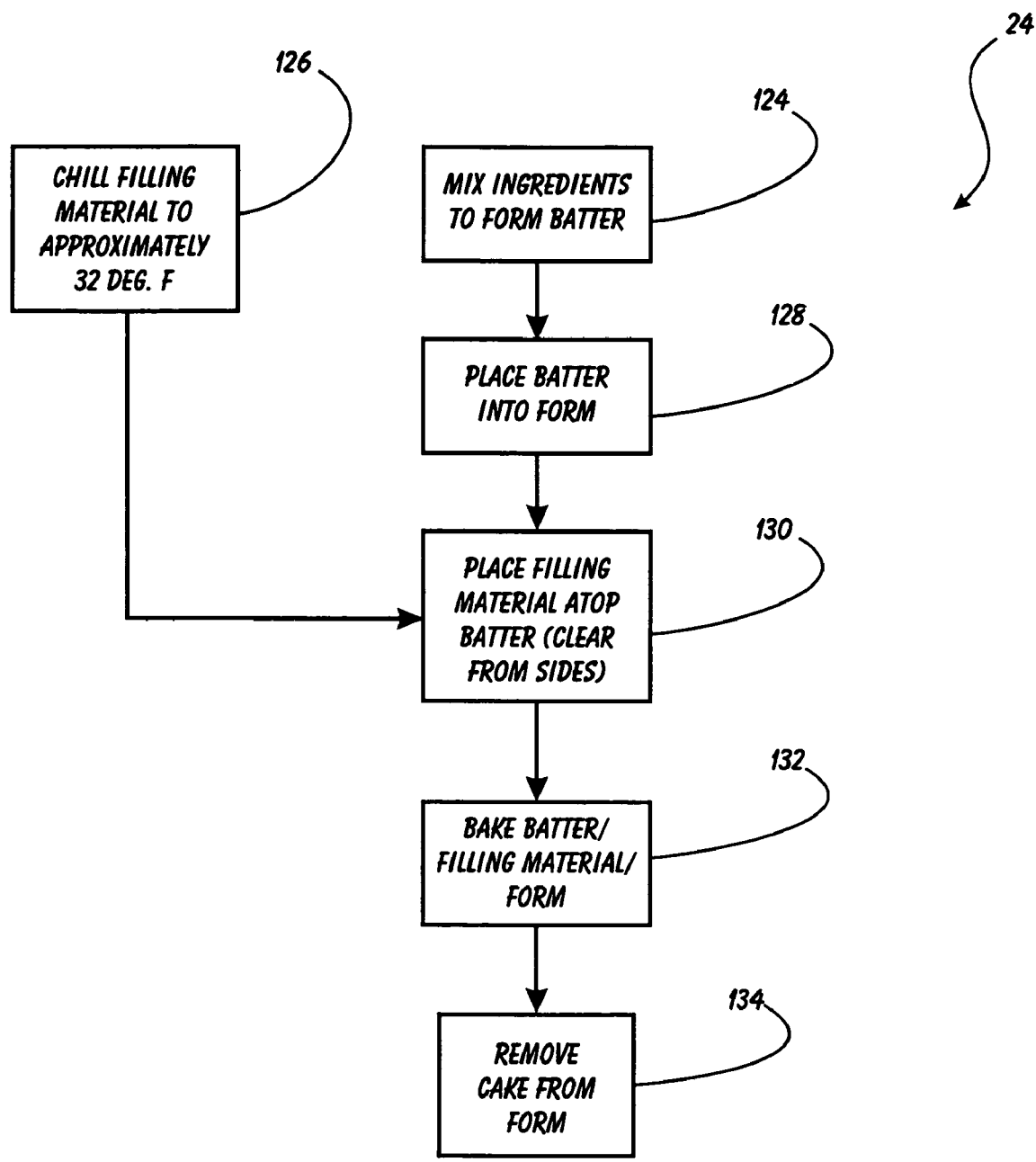
FIG. 4 is a flowchart depicting the steps of the cake baking method of the present invention.

The present invention can best be understood by initial consideration of FIG. 4. FIG. 4 is a flowchart depicting the steps of the cake baking method of the present invention 24. It should be immediately apparent that much fewer steps are necessary to fill a cake with filling material using this approach as compared to the prior art methods discussed above.

First, the cake ingredients are mixed to form a batter 124. This batter is then placed into the baking form 128, such as a cake pan. At some point prior to executing step 130, the filling material is chilled to approximately 32 degrees Fahrenheit 126. This chilling can be accomplished by any convenient method; placing in a freezer for approximately 1 to 1.5 hours has been determined to be particularly effective. The desired temperature range upon completion of the chilling 126 is between approximately 31.5 and 38.5 degrees Fahrenheit. The filling material can be made from a variety of conventional formulas, including banana crème, Bavarian crème, fruit fillings, and even caramel, pecans and coconut.

Once chilled to the correct temperature, the filling material is placed atop the still-liquid uncooked cake batter 130 that is in the form. Next, the form with the batter and filling material is placed in the oven and bake 132. After completely cooked, the cake is removed from the oven, cooled adequately and removed from the form 134. Upon execution of these steps, a completed, filled cake will have been produced.

Figure 5A:
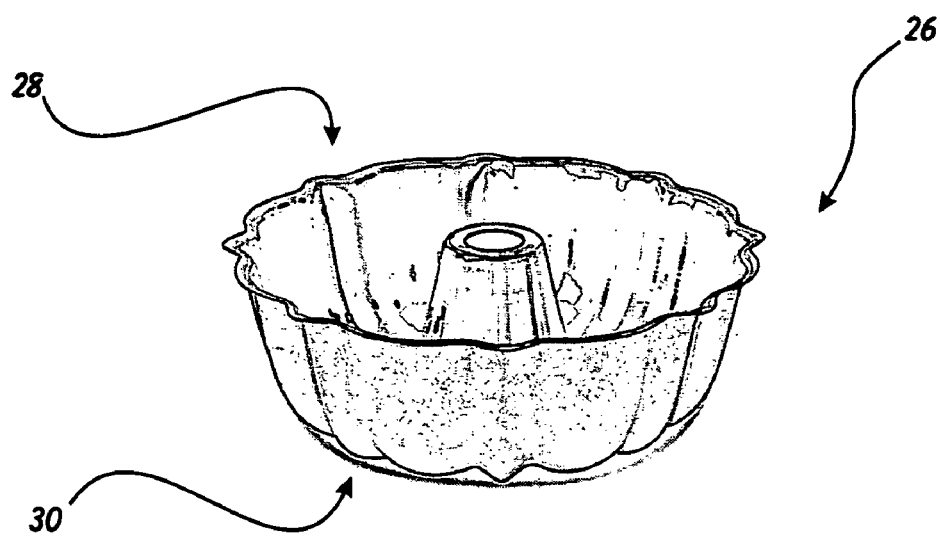
FIGS. 5A-5C depict the cake made by the method of the present invention prior to baking.
Figure 5B:
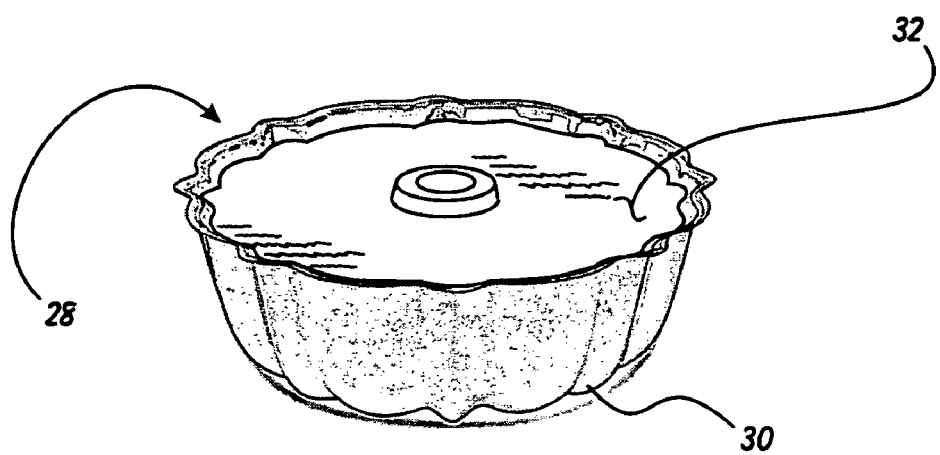
Figure 5C:
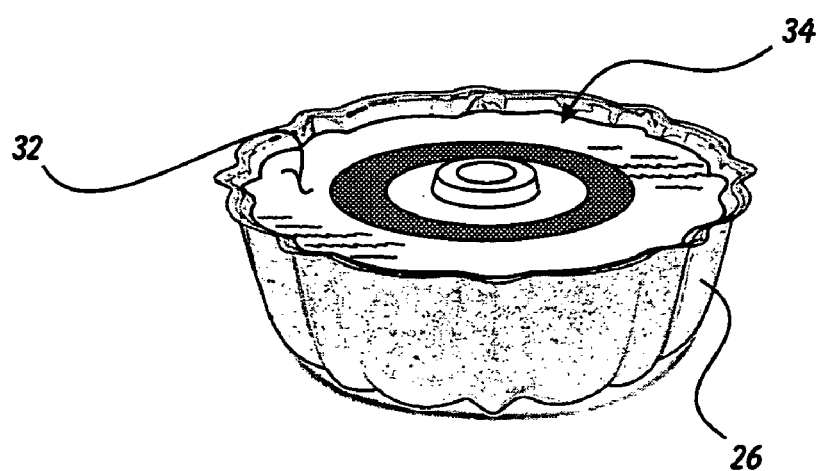

FIGS. 5A-5C depict the cake made by the method of the present invention prior to baking. The cake form 26, here a bundt cake form, is defined by a bottom 30 and a top opening 28. As is well-known, the bottom of the form 30 will be the mold for the top of the cake; the bottom of the cake is the top of the cake form 26.

The raw batter 32 is poured into the form 26 until it is the proper level relative to the top opening 28 such that a complete cake will be created. This could also be in accordance with a pre-mixed cake mix. Finally, the chilled filling material 34 is squeezed, spooned or otherwise placed atop the batter 32, away from the sides of the form 26. Since this is a bundt form 26, the filling material 34 is placed in a ring-shape. In other, conventional cake pans or forms, the filling may simply be poured in s strip in the center of the form. If we now turn to FIGS. 6A and 6B, we can see what the results from following this method.

Figure 6A:
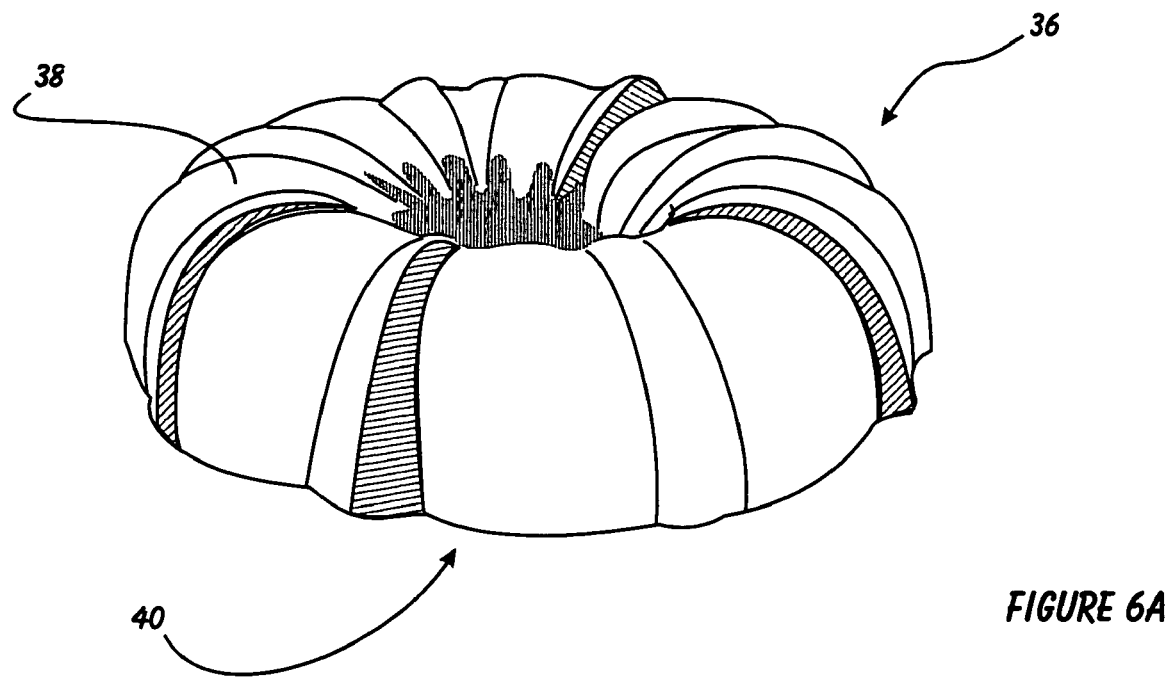
FIGS. 6A and 6B are perspective views of a cake and slice of cake, respectfully, made using the method of the present invention.
Figure 6B:
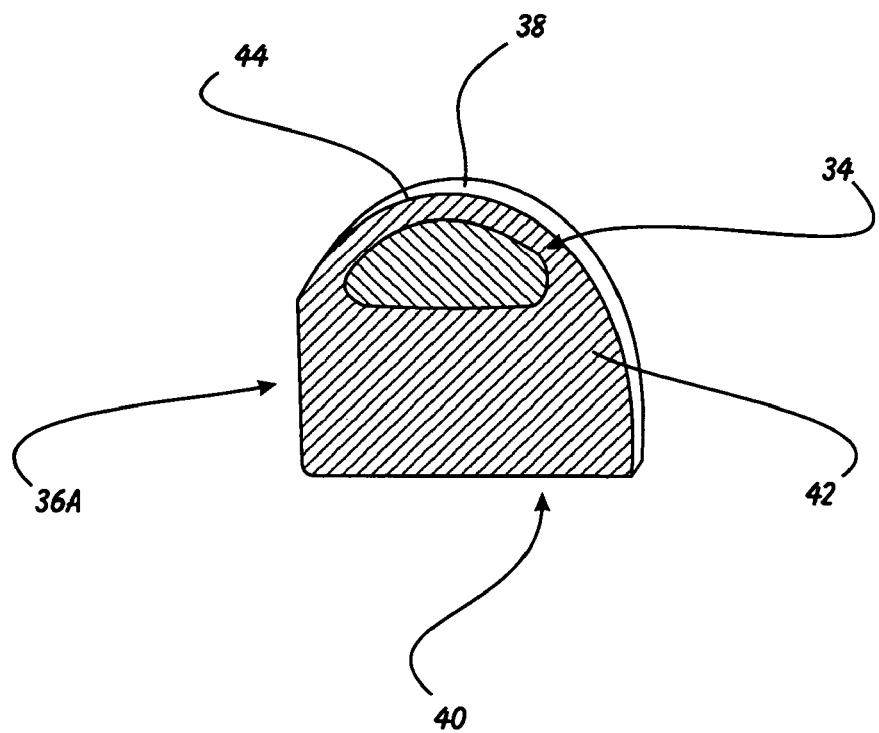

FIGS. 6A and 6B are perspective views of a cake 36 and slice of cake 36A, respectfully, made using the method of the present invention. As depicted here, the cake top 38 (which was at the bottom of the form) is unblemished by cuts or apertures. Similarly, the cake bottom 40 is also sealed and unblemished by cuts or holes. If a slice 36A is cut from the cake 36, its cross-section reveals that the filling material 34 has dropped from the bottom 40 until it is near the top 38 of the cake 36. Due to its location and its relatively colder temperature when first placed in the oven, the filling material 34 has remained largely undissolved, and further is encased completely within the baked cake batter 42, without any breaks in the outer surface 44 of the cake 36A. In fact, depending upon the filling material, it is possible that some small amount of filling material 34 will be dispersed into the batter 42, which has been determined to actually add additional flavor and improved moisture and texture over simple cake batter alone. It has been proven effective even with store-bought boxed cake mixes.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for baking a cake, comprising the steps of:
   mixing cake batter ingredients to form a cake batter;
   placing said cake batter into a cake form;
   chilling a filling material, until said filling material is between approximately 31.5 and approximately 38.5 degrees Farhenheit;
   adding said chilled filling material to said cake batter;
   baking said cake form, cake batter and filling material until said batter is sufficiently cooked to form a finished cake; and
   removing said finished cake from said form.

2. The method of claim 1, wherein said chilling step comprises chilling said filling material until said filling material is approximately 32 degrees Fahrenheit.

3. The method of claim 2, wherein said baking step comprises baking said cake batter, filling material and cake form whereby a cake is formed defined by an unbroken surface having said filling material encased therein.

4. A method for creating a filled food item, comprising the steps of:
   mixing batter ingredients to form a batter;
   placing said batter into a form, wherein said first batter defines a first density;
   chilling a filling material until said filling material is between approximately 31.5 and 38.5 degrees Fahrenheit, whereby said filling material defines a second density, said second density being greater than said first density;
   adding said chilled filling material to said batter;
   baking said form, batter and said filling material until said batter is sufficiently cooked to form a finished confectionary; and
   removing said finished confectionary from said form.

5. The method of claim 4, wherein said chilling step comprises chilling said filling material until said filling material is approximately 32 degrees Fahrenheit.

6. The method of claim 5, wherein said baking step comprises baking said batter, filling material and form, whereby a confectionary is formed, said confectionary defined by an unbroken surface of cooked batter and further having said filling material fully encased within said surface.

7. A method for baking a cake, comprising the steps of:
   chilling a filling material until said filling material is between approximately 31.5 and approximately 38.5 degrees Fahrenheit;
   mixing cake batter ingredients to form a cake batter;
   placing said cake batter into a cake form, said cake form defined by a bottom, one or more sides extending upwardly from said bottom, said sides terminating in a top opening, said cake batter forming a top surface once placed into said cake form;
   adding said chilled filling material to said cake batter by placing said chilled filling material onto said top surface;
   baking said cake form, cake batter and filling material until said batter is sufficiently cooked to form a finished cake; and
   removing said finished cake from said form.

8. The method of claim 7, wherein said chilling step comprises chilling said filling material until said filling material is approximately 32 degrees Fahrenheit.

9. The method of claim 8, wherein said baking step comprises baking said cake batter, filling material and cake form whereby a cake is formed defined by an unbroken surface having said filling material encased therein.

10. The method of claim 7, wherein said cake batter comprises a chocolate flavor and said filling material comprises caramel and coconut.

11. The method of claim 7, wherein said filling material comprises Bavarian crème.

12. The method of claim 7, wherein said filling material comprises fruit gel.

* * * * *